(12) United States Patent
Hassanzadeh et al.

(10) Patent No.: US 11,685,680 B2
(45) Date of Patent: Jun. 27, 2023

(54) SYSTEM AND METHOD OF RAIN WATER COLLECTION AND PURIFICATION

(71) Applicant: Your Rain Systems, Inc., Merced, CA (US)

(72) Inventors: Ali Hassanzadeh, Merced, CA (US); Justin Hicks, Merced, CA (US)

( * ) Notice: Subject to any disclaimer, the term of this patent is extended or adjusted under 35 U.S.C. 154(b) by 0 days.

(21) Appl. No.: 17/395,156

(22) Filed: Aug. 5, 2021

(65) Prior Publication Data

US 2021/0363046 A1 Nov. 25, 2021

Related U.S. Application Data

(63) Continuation-in-part of application No. 16/687,655, filed on Nov. 18, 2019, now abandoned.

(51) Int. Cl.
| | | |
|---|---|---|
| *C02F 1/14* | (2023.01) | |
| *C02F 1/12* | (2023.01) | |
| *C02F 9/00* | (2023.01) | |
| C02F 1/04 | (2023.01) | |
| C02F 103/00 | (2006.01) | |
| C02F 1/68 | (2023.01) | |
| C02F 1/00 | (2023.01) | |

(52) U.S. Cl.
CPC .............. *C02F 9/00* (2013.01); *C02F 1/001* (2013.01); *C02F 1/048* (2013.01); *C02F 1/12* (2013.01); *C02F 1/14* (2013.01); *C02F 1/68* (2013.01); *C02F 2103/001* (2013.01); *C02F 2301/08* (2013.01); *C02F 2303/04* (2013.01)

(58) Field of Classification Search
CPC ... C02F 1/04–18; B01D 5/006; B01D 1/0029; B01D 1/0035; B01D 1/16; B01D 1/18; B01D 1/20
See application file for complete search history.

(56) References Cited

U.S. PATENT DOCUMENTS

| | | | | |
|---|---|---|---|---|
| 3,311,543 | A | * | 3/1967 | Loebel ................. B01D 1/2887 202/202 |
| 3,393,131 | A | * | 7/1968 | McIntyre, Jr. ............ C02F 1/10 203/40 |
| 3,775,257 | A | * | 11/1973 | Lovrich .................... C02F 1/14 202/202 |
| 3,860,492 | A | * | 1/1975 | Lowi, Jr. ................... C02F 3/10 159/13.1 |
| 3,896,005 | A | * | 7/1975 | Zuccolotto ............. B01D 35/18 202/185.1 |

(Continued)

*Primary Examiner* — Jonathan Luke Pilcher
(74) *Attorney, Agent, or Firm* — George B. Leavell

(57) ABSTRACT

A system and method for collecting and purifying rainwater. The system includes a humidifier including a heat exchanger for preheating collected rainwater. The preheated water is output to a heater. The heater heats the water to between about 80 degrees C. and about 100 degrees C. The humidifier also includes a nozzle coupled to an outlet of the heater. The nozzle injects water vapor into the humidifier. The humidifier also includes a fan capable of circulating the water vapor in an inner volume of the humidifier. The water vapor condenses on an outer surface of the heat exchanger. The system also includes a collector for collecting the condensed potable water from the outer surface of the heat exchanger and a delivery system for delivering the potable water.

10 Claims, 8 Drawing Sheets

(56) References Cited

U.S. PATENT DOCUMENTS

| | | | | |
|---|---|---|---|---|
| 4,243,526 | A * | 1/1981 | Ransmark | C02F 1/10 |
| | | | | 202/234 |
| 4,953,694 | A * | 9/1990 | Hayashi | B01D 5/009 |
| | | | | 96/219 |
| 5,096,543 | A * | 3/1992 | Elmore | C02F 1/16 |
| | | | | 203/10 |
| 5,720,856 | A * | 2/1998 | Pirone | C02F 1/048 |
| | | | | 202/202 |
| 7,121,101 | B2 * | 10/2006 | Merritt | C02F 1/12 |
| | | | | 62/93 |
| 8,496,234 | B1 * | 7/2013 | Govindan | B01D 5/0039 |
| | | | | 261/157 |
| 8,974,643 | B2 * | 3/2015 | Metz | C02F 1/12 |
| | | | | 202/202 |
| 9,259,667 | B2 * | 2/2016 | Roch | B01D 5/006 |
| 9,416,800 | B2 * | 8/2016 | Govindan | B01D 1/0058 |
| 9,428,403 | B2 * | 8/2016 | Haynes | B01D 1/0094 |
| 2010/0288619 | A1 * | 11/2010 | Yabe | B01D 1/0035 |
| | | | | 202/234 |
| 2011/0266132 | A1 * | 11/2011 | Takezaki | B01D 1/0052 |
| | | | | 202/233 |
| 2012/0085635 | A1 * | 4/2012 | Haynes | C02F 1/06 |
| | | | | 202/185.1 |
| 2014/0014212 | A1 * | 1/2014 | Govindan | B01D 1/0082 |
| | | | | 137/806 |
| 2015/0047963 | A1 * | 2/2015 | Roch | C02F 1/10 |
| | | | | 202/185.1 |
| 2016/0264431 | A1 * | 9/2016 | Enders | B01D 1/0035 |

\* cited by examiner

SYSTEM AND METHOD OF RAIN WATER COLLECTION AND PURIFICATION

CROSS REFERENCE TO RELATED APPLICATIONS

This application is a continuation in part and claims priority from U.S. patent application Ser. No. 16/687,655, filed on Nov. 18, 2019 and entitled "System and Method of Rain Water Collection and Purification," which is incorporated herein by reference in its entirety for all purposes.

FIELD OF THE DISCLOSURE

The present disclosure relates generally to water purification systems, and more particularly, to methods and systems for collecting rain water and purifying the collected rain water for use as potable water.

BACKGROUND

Rain water can be collected from numerous sources and surfaces such as a roof top, a parking lot or driveway, or any other surface on which rain main fall. Rain water collected from a roof top is typically significantly less contaminated than rain water collected from a parking lot or a driveway. Rain water may be collected in a portable water storage, such as a rain barrel, or collected in water features, such as a pond. The collected rain water is can then be used for external, non-potable uses such as irrigating lawns, planters and other plants.

There are many small scale, portable, water treatment methods and systems, often referred to as camping and emergency water treatment systems, that can clean limited quantities of unpurified water to be suitable for human consumption. However, the camping and emergency water treatment methods and systems typically rely on a simple particulate filter and chemical treatment process that is only effective for relatively small, batch quantities of water, such as about 2-20 liters. The camping and emergency water treatment methods and systems typically require full replacement after treating the designed quantity of water. Further, camping and emergency water treatment methods and systems typically use chemicals, such as chlorine and similar disinfectants, to render potentially harmful microscopic contaminants sufficiently inert for human consumption. The chemical treatment of the water typically results in water that is not desirable in taste or smell.

Collected rain water is not typically treated on-site to produce relatively un-limited, potable water due to cost, size, efficiency and complexity of the required treatment processes and the systems to support the required treatment processes. It is in this context that the following embodiments arise.

SUMMARY

Broadly speaking, the present disclosure fills these needs by providing a system and method of rain water collection and purification for potable uses as needed in a residential scale of on-going demand. It should be appreciated that the present disclosure can be implemented in numerous ways, including as a process, an apparatus, a system, computer readable media, or a device. Several inventive embodiments of the present disclosure are described below.

One implementation includes a method of purifying rainwater includes collecting rainwater and sanitizing the collected rainwater. Sanitizing the collected rainwater includes preheating the collected rainwater in a heat exchanger to output preheated water, heating the preheated water to a heated water temperature of between about 80 degrees C. and about 100 degrees C., creating water vapor in a humidifier, the humidifier including the heat exchanger, condensing a first portion of the water vapor on an outer surface of the heat exchanger to form a first portion of potable water, collecting the first portion of the potable water and delivering the first portion of the potable water.

The heater can include a solar water heater. Collecting the rainwater can include filtering the collected rainwater to substantially remove particulate matter from the collected rainwater. Delivering the first portion of the potable water can include filtering the potable water through a second stage filter and/or adding one or more minerals to improve the palatability of the first portion of potable water.

Condensing the first portion of the water vapor on the outer surface of the heat exchanger to form the first portion of potable water can include circulating the water vapor though the humidifier with a fan.

Another implementation includes a rainwater purification system including a humidifier. The humidifier includes a heat exchanger capable of increasing a temperature of a quantity of water output from the heat exchanger by about 20 degrees C. The heat exchanger has an input coupled to a collected rainwater storage. The system also includes a heater having an input coupled to an output of the heat exchanger. The heater is capable of outputting water having a temperature of between about 80 degrees C. and about 100 degrees C. The humidifier includes a nozzle being coupled to an outlet of the heater. The nozzle injects water vapor into the humidifier. The humidifier also includes a fan capable of circulating the water vapor in an inner volume of the humidifier. The system also includes a bottom of the heat exchanger for collecting the condensed potable water from the outer surface of the heat exchanger.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for system and method of rainwater collection and purification will now be described. It will be apparent to those skilled in the art that the present disclosure may be practiced without some or all of the specific details set forth herein.

Figure 1:
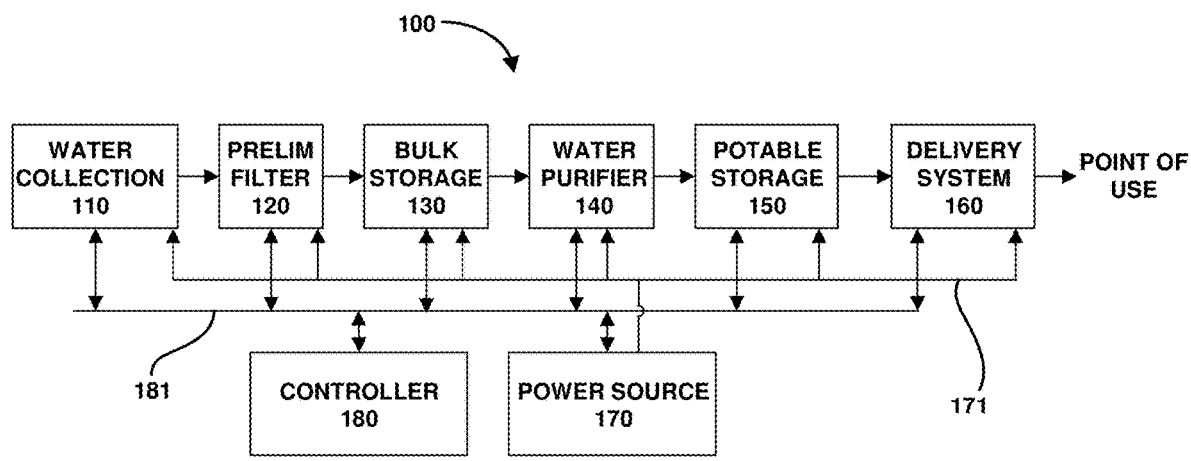
FIG. 1 is a simplified block diagram of a rainwater collection and purification system, for implementing embodiments of the present disclosure.

Rain water collection and purification can include several steps: collecting the water, preliminary filtration of the collected water, storage of the collected water, purification of the collected water and delivery to the point of use. FIG. 1 is a simplified block diagram of a rainwater collection and purification system 100, for implementing embodiments of the present disclosure. The rainwater collection and purification system 100 includes a water collection subsystem 110, a preliminary filter 120, a bulk storage 130, a water purifying subsystem 140, a potable storage 150 and a delivery system 160. The rainwater collection and purification system 100 also includes a power source 170 for powering the system and a controller 180 for monitoring and controlling the operations of the system. The power source 170 and the controller 180 are coupled to each of the water collection subsystem 110, the preliminary filter 120, the bulk storage 130, the water purifying subsystem 140, the potable storage 150 and the delivery system 160 through respective power bus 171 and control bus 181. The rainwater collection and purification system 100 can also include one or more pumps to move the water through the system, as needed.

The power source 170 supplies the necessary power for operating the rainwater collection and purification system 100. The power source 170 can include multiple power sources such as line current provided by a local power grid, a solar power source or other renewable power sources, power storage media such as a battery, or similar storage media, and combinations thereof.

The controller 180 includes the operating system needed to operate the system 100. The controller 180 is coupled to multiple sensors for detecting pressure, flow rates, humidity, temperatures, water levels and other sensors utilized for operating the rainwater collection and purification system 100. The controller 180 is coupled to, and controls multiple control devices such as pumps, valves, fans, heaters and other control devices, as may be used to operate the system.

Figure 2:
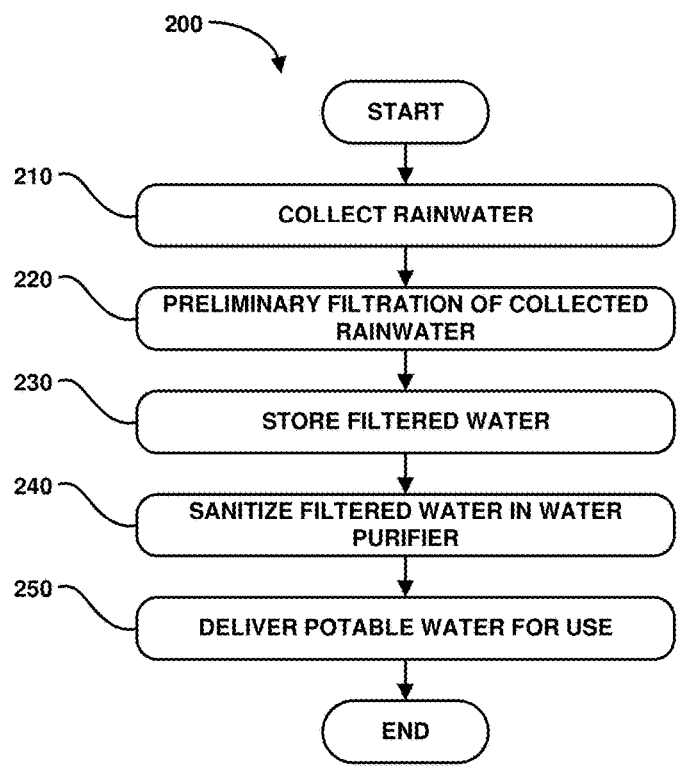
FIG. 2 is a flowchart diagram that illustrates the method operations performed in rain water collection and purification, for implementing embodiments of the present disclosure.

FIG. 2 is a flowchart diagram that illustrates the method operations 200 performed in rain water collection and purification, for implementing embodiments of the present disclosure. The operations illustrated herein are by way of example, as it should be understood that some operations may have sub-operations and in other instances, certain operations described herein may not be included in the illustrated operations. With this in mind, the method and operations 200 will now be described. The following is a brief overview of the system 100 and the method operations 200, with reference to both FIGS. 1 and 2.

The water collection subsystem 110 can include guttering and piping arranged to collect rainwater running off any suitable surface, such as a roof or other surface exposed to rain. In at least one implementation, the water collection subsystem 110 can include a typical roof gutter and downspout system that collects and directs rainwater to the preliminary filter 110. In an operation 210, the water collection subsystem 110 collects rainwater from a roof or similar suitable surface and delivers the collected rainwater to the preliminary filter 120.

The preliminary filter 120 eliminates most particulate matter in the collected rainwater, in an operation 220. There are several suitable implementations and combinations thereof that could be used for the preliminary filter function. In one implementation, the preliminary filter includes a basin, or similar preliminary storage facility, for temporarily holding the collected rainwater for a time sufficient for allowing particles suspended in the collected rainwater water to settle to the bottom of the basin as a collected sediment. The preliminary filter can also include a self-flushing system for periodically removing collected sediments from the bottom of the basin.

The preliminary filter 120 can also include or alternatively include other types of physical filter media such as paper, cloth, fiber, sand, diatomaceous earth and other suitable types of physical filter media, and combinations thereof, that can separate particles suspended in the collected rainwater. The physical filter media can also include a self-flushing system for periodically removing the particles separated from the collected rainwater from the physical filter media.

An optional pump can be included in and used by the preliminary filter 120 to circulate the water through the physical filter media and/or to flush the collected sediments from the bottom of the basin and other self-cleaning type cycles that may be implemented to periodically clean the preliminary filter.

The filtered water passes from the preliminary filter 120 to the bulk storage 130, in an operation 230. There are many suitable implementations for the bulk storage. Above ground implementations are the simplest and least expensive to utilize. Suitable above ground implementations of the bulk storage can include a typical rain barrel or barrels or similar storage such as a rain fence such as described in U.S. Pat. No. 9,279,271 to McDowell, as issued on Mar. 8, 2016, and which describes a fence shaped container having the ability to store a quantity of rainwater. The bulk storage 130 can be implemented as a single storage unit or multiple storage units that are fluidly coupled together so as to allow water to be stored in the multiple storage units and drawn from the multiple storage as is needed.

In an operation 240, water is drawn from the bulk storage 130 to the purifying subsystem 140 where the water is purified to be potable and suitable for human consumption. One or more pumps and corresponding piping systems can be used to move the water from the bulk storage to the purification subsystem 140. In an operation 250, the potable water is output to the delivery system 150. The sanitization subsystem 140 is described in more detail below.

The delivery system 150 includes suitable piping systems for delivering the potable water to the user. In at least one implementation, the delivery system is coupled to a home's potable water supply, through a check-valve to prevent water from the home's potable water supply from flowing into the purifying subsystem 140 and preventing the potable water from flowing from the delivery system into a municipal supply delivering water to the home.

Figure 3A:
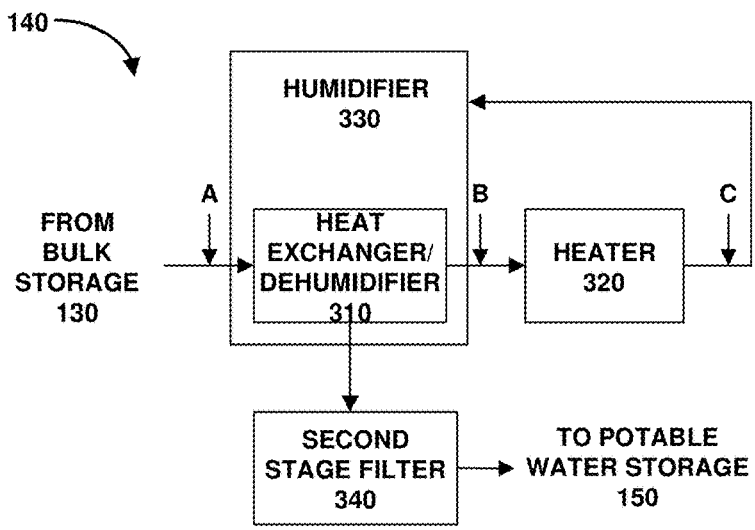
FIG. 3A is a simplified schematic of the purifying subsystem, for implementing embodiments of the present disclosure.

FIG. 3A is a simplified schematic of the purifying subsystem 140, for implementing embodiments of the present disclosure. In at least one implementation, the purifying subsystem 140 includes a heat exchanger/dehumidifier 310, a heater 320, a humidifier 330 and an optional second stage filter 340.

Figure 3B:
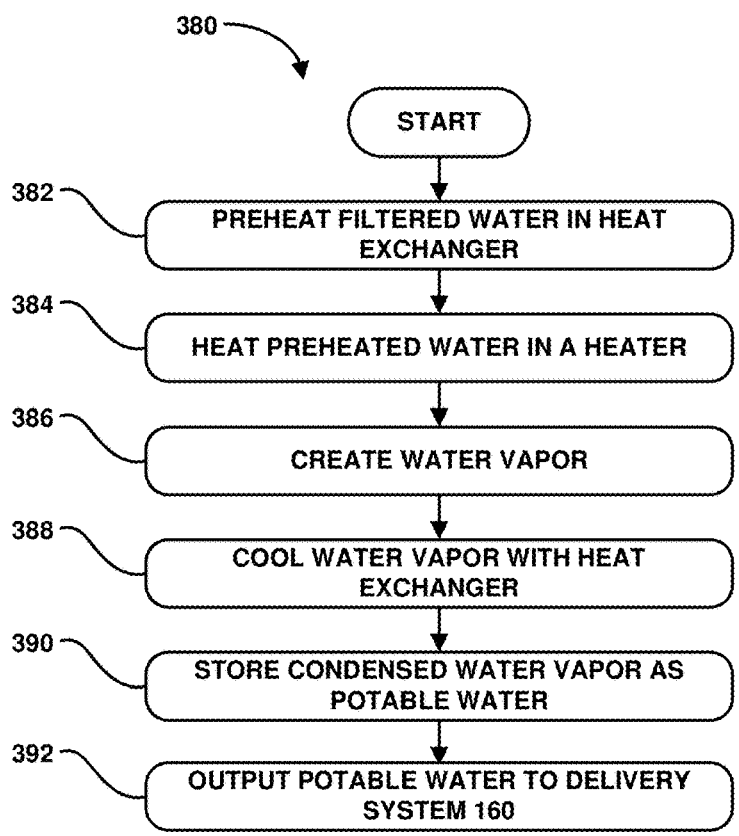
FIG. 3B is a flowchart diagram that illustrates the method operations performed in purifying the collected rain water, for implementing embodiments of the present disclosure.

FIG. 3B is a flowchart diagram that illustrates the method operations 380 performed in purifying the collected rain water, for implementing embodiments of the present disclosure. The operations illustrated herein are by way of example, as it should be understood that some operations may have sub-operations and in other instances, certain operations described herein may not be included in the illustrated operations. With this in mind, the method and operations 380 will now be described, with reference to both FIGS. 3A-3B.

In an operation 382, input water is drawn from the bulk storage 130 and input to the heat exchanger/dehumidifier 310. The input water has a temperature of about ambient temperature A, of between about 10-20 degrees C., at the input of the heat exchanger/dehumidifier 310. The heat exchanger/dehumidifier 310 transfers heat from water vapor, as will be described in more detail below. The heat exchanger/dehumidifier 310 outputs preheated water having a preheated water temperature B is between about 20 degrees C. and about 50 degrees C. greater than the ambient temperature A.

In an operation 384, the preheated water is output from the heat exchanger/dehumidifier 310 to the water heater 320. The water heater 320 heats the preheated water to produce heated water having a heated water temperature C of between about 80 degrees C. and about 100 degrees C. The water heater 320 can be a solar water heater, a gas water heater (natural or propane), an electric water heater or combinations thereof.

In an operation 386, the heated water is input to the humidifier 330 through one or more input nozzles to create a water vapor inside the inner volume of the humidifier. The heat exchanger/dehumidifier 310 is included inside the inner volume of the humidifier.

In an operation 388, a first portion of the water vapor impinges on a cooled outer surface of the heat exchanger/dehumidifier 310. The cooled outer surface of the heat exchanger/dehumidifier 310 is cooled by the input water flowing though the inside of the heat exchanger/dehumidifier, as described in operation 382, above. The first portion of the water vapor condenses to a first portion of potable water and drips off the cooled outer surface of the heat exchanger/dehumidifier to collect at a bottom 338A of the inner volume 338 of the heat exchanger/dehumidifier. The input water flowing through the inside of the heat exchanger/dehumidifier is heated by the water vapor that condenses on the outer surface of the heat exchanger/dehumidifier.

A second portion of the water vapor impinges on one or more cooler inner surfaces inside the inner volume of the humidifier 330. The second portion of the water vapor condenses on the cooler inner surface(s) 334, 335, 336 to a second portion of potable water and drips off the inner surfaces to collect at the bottom 338A of the inner volume 338 of the heat exchanger/dehumidifier 310.

A remaining, third portion of the water vapor condenses on the inner surface 330A of the humidifier 330. The third portion of the water vapor is collected at the bottom 339B' of the humidifier and is returned to the bulk storage 130. The third portion of water, captured at the bottom 339B' of the humidifier, has been heated within the heat exchanger and heater. Returning the third portion of the water to the bulk storage 130 increases the temperature of the water in the bulk storage, thus recapturing the thermal energy in the third portion of the water. This recapturing the thermal energy in the third portion of the water increases the overall thermal efficiency of the purifying subsystem 140.

In at least one implementation, the humidifier 330 includes one or more fans 337 to circulate the water vapor within the humidifier to increase the water vapor impinging on the cooled surfaces within the humidifier.

In an operation 390, the first and second portions of the potable water are output from the heat exchanger/dehumidifier 310 to the potable water storage 150. Optionally, the first and second portions of the potable water can be filtered through optional second stage filter 340. Alternatively, the optional second stage filter 340 can be located at an outlet of the potable water storage 150. The optional second stage filter 340 can be any point of use filter deemed safe by accepted regulatory standards as ensuring safe drinking water; which guarantees the removal of any other possible impurities that might pass through the liquid-vapor-liquid cycle occurring in the water purifier 140.

The potable water produced as described above includes very few minerals. Water palatability corresponds, in large part, to the minerals content of the water. The second stage filter 340 can also include a mineral additive stage for adding any desired minerals to the potable water.

Figure 3C:
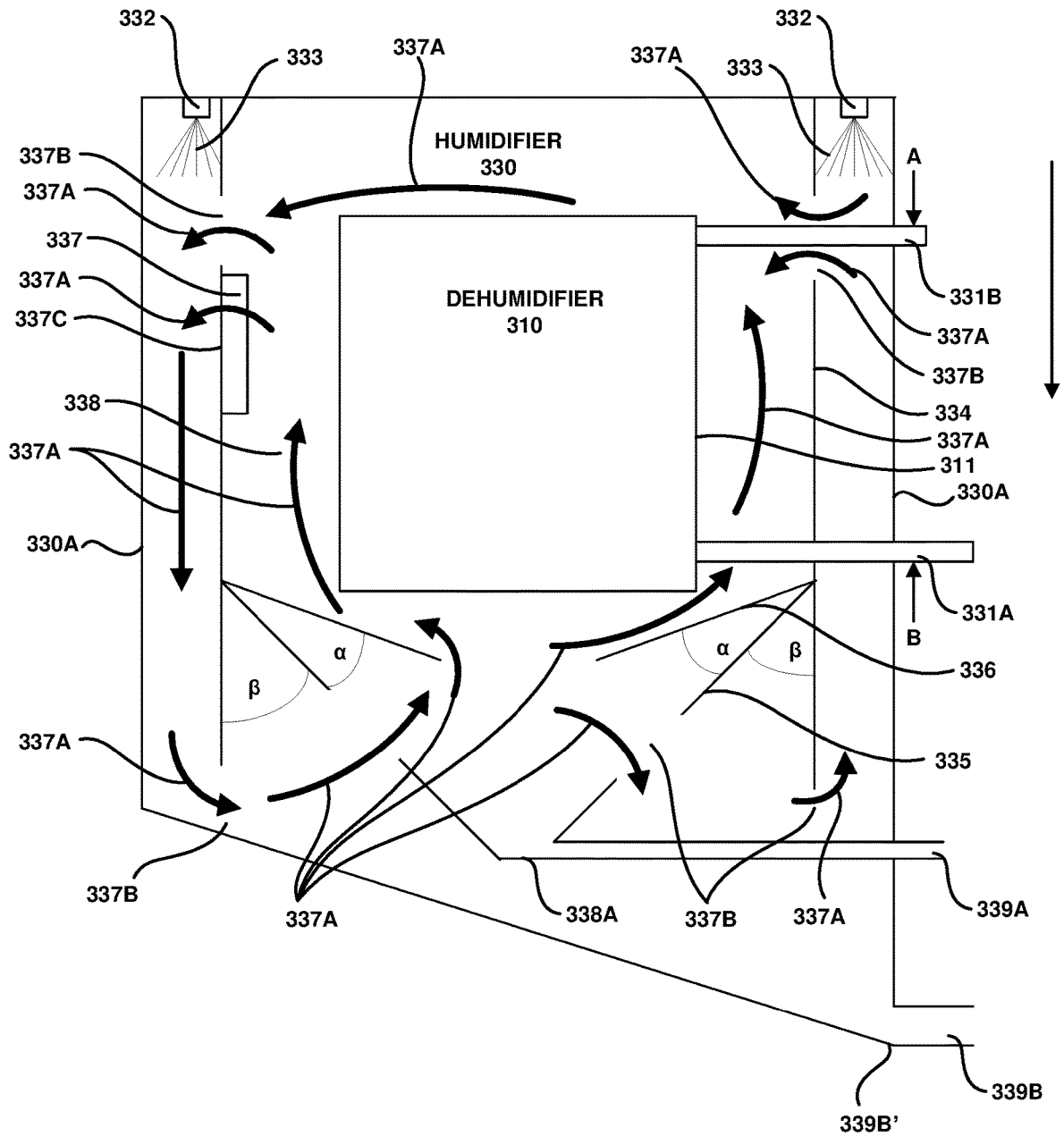
FIG. 3C is a schematic of a humidifier, for implementing embodiments of the present disclosure.

FIG. 3C is a schematic of a humidifier 330, for implementing embodiments of the present disclosure. The humidifier 330 includes nozzles 332 for emitting water vapor 333 into the inner volume 338 of the humidifier. The heat exchanger/dehumidifier 310 is included in the inner volume 338 of the humidifier. Ambient temperature water enters the inlet 331A of the heat exchanger/dehumidifier 310. The water is preheated in the heat exchanger/dehumidifier 310 by absorbing heat from the water vapor 333. The preheated water passes through the outlet 331B of the heat exchanger/dehumidifier 310.

The outer surfaces 311 of the heat exchanger/dehumidifier 310 are cooled as the ambient temperature water passes through inner portions of the heat exchanger/dehumidifier and out the outlet 331B of the heat exchanger/dehumidifier. The first portion of the water vapor condenses on and drips off the outer surfaces of the heat exchanger/dehumidifier to form a first portion of potable water. The first portion of potable water is collected at a bottom 338A of the inner volume.

The inner surfaces 334, 335, 336 of the humidifier 330 are cooler than the water vapor 333 causing the second portion of the water vapor to condense on the inner surfaces and collect at the bottom 338A of the inner volume. The inner surfaces 334, 335, 336 and/or the one or more nozzles 334 can be any suitable material including one or more types of plastic, and/or metal and combinations thereof. In one implementation, at least some of the inner surfaces 334, 335, 336 and/or the one or more nozzles 334 are polyethylene or any food grade plastic or other material, such as stainless steel, that is compatible with the operating temperatures is sufficient. The one or more nozzles 334 are electrically neutral or floating and that no specifically selected electrical potential is applied to the one or more nozzles.

One or more fans 337 circulate the water vapor 333 through the inner volume 338 of the humidifier as indicated by arrows 337A. The water vapor 333 passes through various openings 337B, 337C to circulate through the inner volume 338 of the humidifier 330. Circulating the water vapor 333 with the fan(s) 337 increases the contact of the water vapor on the inner surfaces 334, 335, 336 of the humidifier 330 and the outer surfaces 311 of the heat exchanger/dehumidifier 310. The speed of the fan(s) 337 is selected corresponding to the temperature and humidity of the water vapor the inner volume 338. The speed of the fan(s) 337 also corresponds to the rate the water vapor circulates in the inner volume 338 of the humidifier. The delta in temperature "Delta T" between the temperature of the water vapor in the inner volume and the temperature of an outer surface of the inner coil of the heat exchanger causes a portion of the water vapor to condense on the outer surface of the heat exchanger to form a portion of potable water. The Delta T varies based on the heating occurring in the heat exchanger and how much the preheated water is heated in the heater 320. In at least one embodiment, the heater 320 is a solar heater or other variable heat source, and therefore the temperature increase in water inside the heater is variable according to the amount of solar energy that is effectively collected and imparted to the preheated water within the heater to produce heated water having a correspondingly variable output temperature of the heated water output from the heater 320 and input to the one or more nozzles 332. The controller can automatically modulate the airflow through the inner volume, based the Delta T, including adjusting the flow rate through the one or more fans to maximize the condensation of the water vapor and therefore produce the most potable water. In at least one implementation, the sum of angles α and β of angled lower inner surfaces 335, 336, relative to the inner surface 334 of the humidifier can be between about 45 degrees and about 90 degrees. In at least one implementation, angle α can be between about 10 and about 30 degrees. In at least one implementation, angle can be between about 15 and about 80 degrees. Water vapor and contaminants are separated due mass difference. Typically, there is little to no need to purge the bottom 339B' of the humidifier since the pressure of feedwater carries majority of contamination out. The remained contamination can be periodically removed using, for example, an acidic solution one or more times annually or similar time interval or as needed based on quantity of remaining contaminants.

Figure 4A:
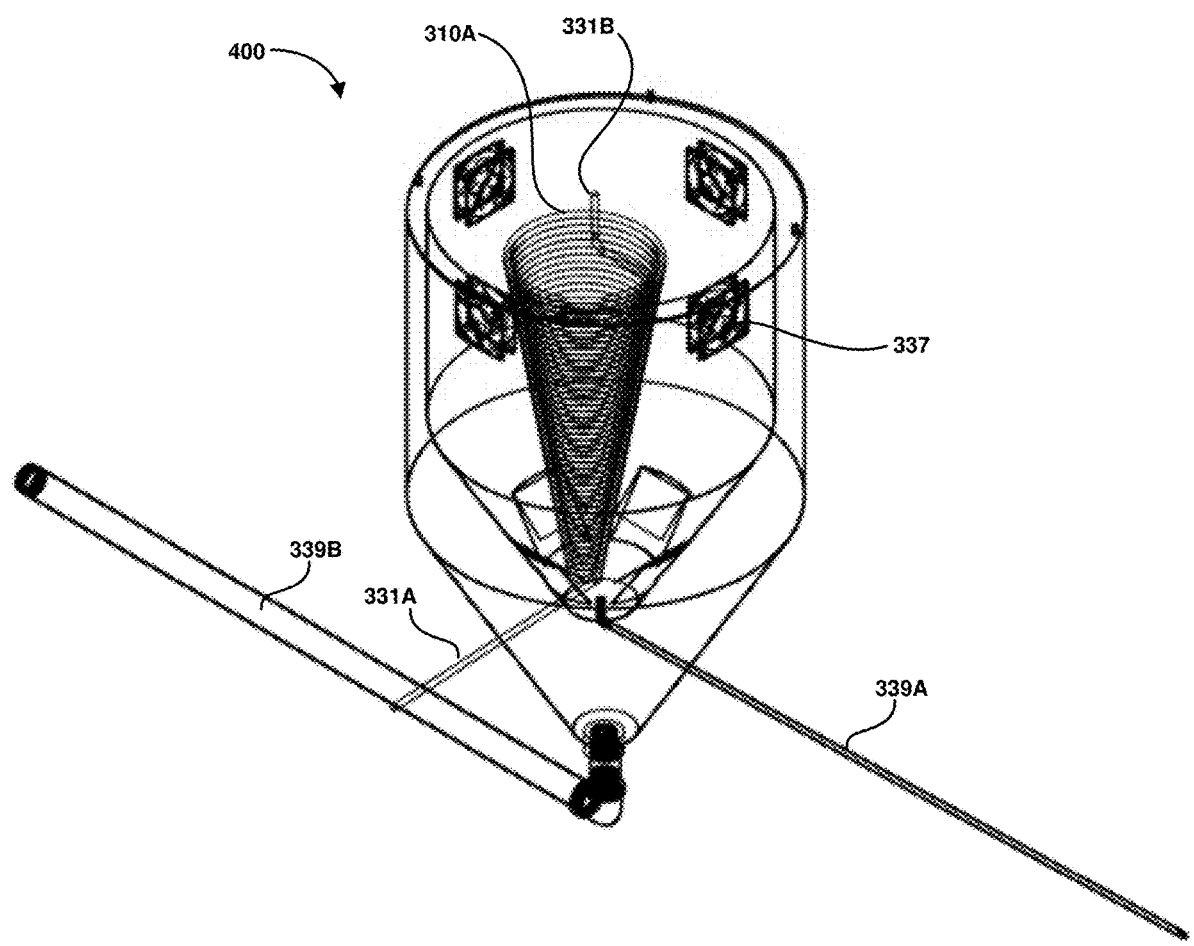
FIG. 4A is a perspective view of a humidifier, for implementing embodiments of the present disclosure.
Figure 4B:
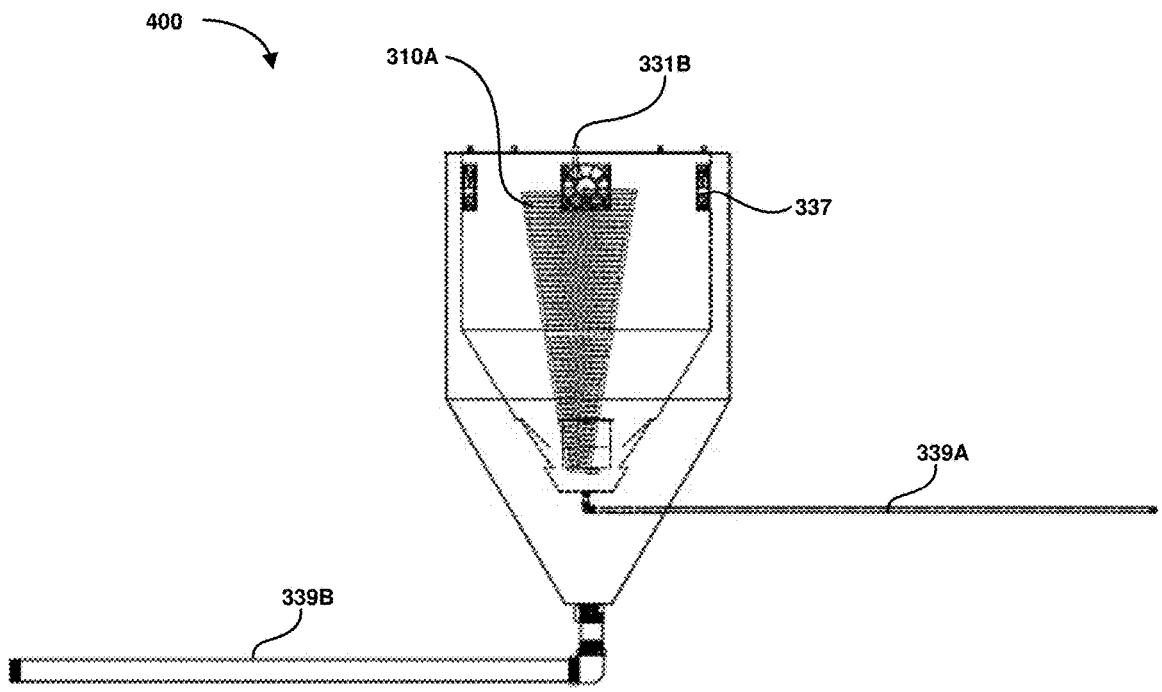
FIG. 4B is a side view of the humidifier, for implementing embodiments of the present disclosure.
Figure 4C:
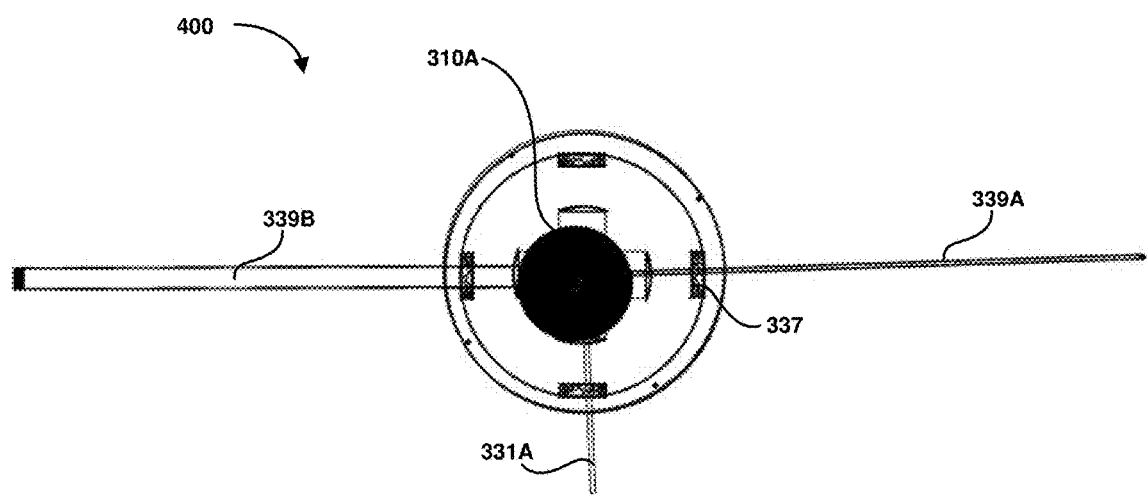
FIG. 4C is a top view of the humidifier, for implementing embodiments of the present disclosure.
Figure 5A:
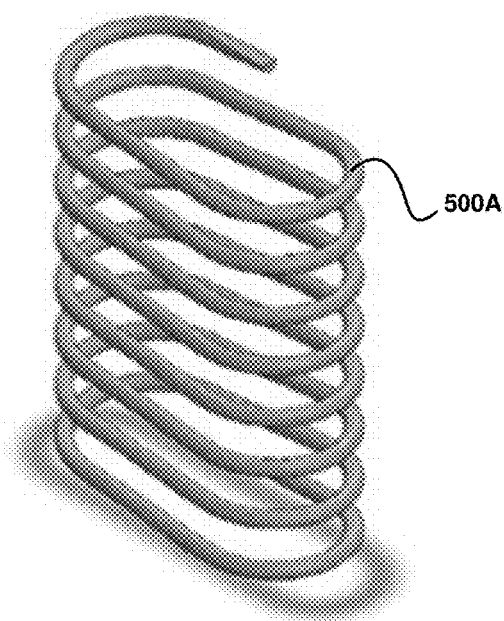
FIGS. 5A-D are perspective views of coils of tubing for a heat exchanger/dehumidifier for implementing embodiments of the present disclosure.
Figure 5B:
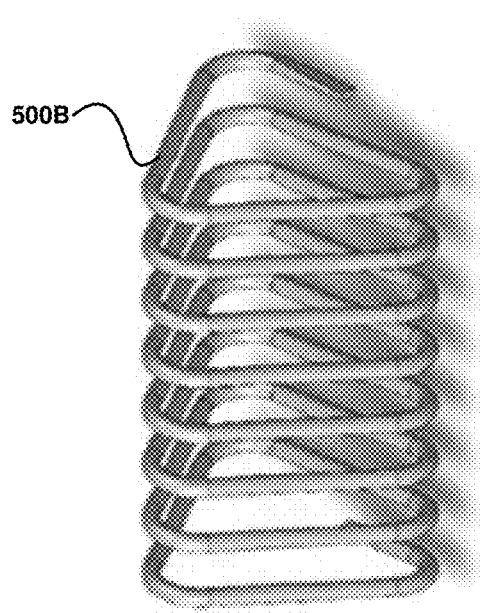
Figure 5C:
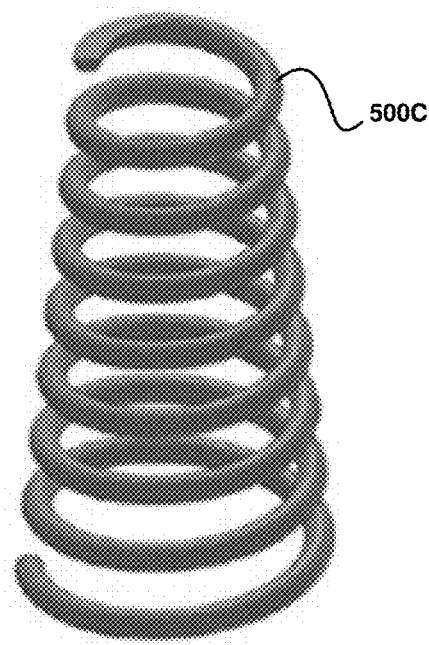
Figure 5D:
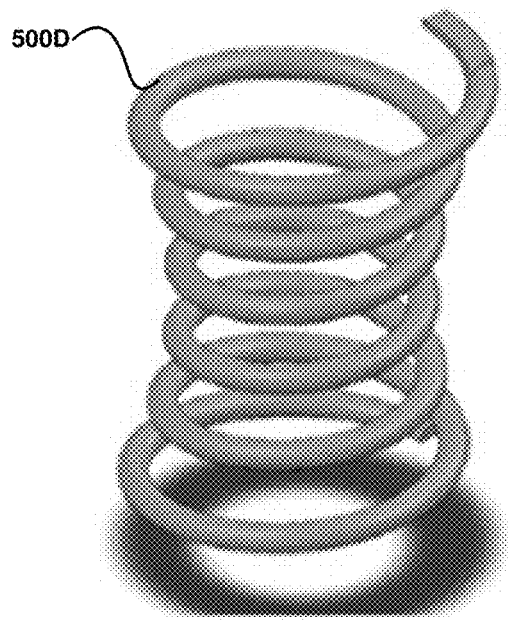

FIG. 4A is a perspective view of a humidifier 400, for implementing embodiments of the present disclosure. FIG. 4B is a side view of the humidifier 400, for implementing embodiments of the present disclosure. FIG. 4C is a top view of a humidifier 400, for implementing embodiments of the present disclosure. The humidifier 400 is substantially cylindrical in shape. It should be understood that the cylindrical shape is merely one example of shapes. The humidifier can be any suitable shape. The humidifier 400 includes multiple fans 337. Four fans 337 are shown, however more or fewer fans could be utilized.

The humidifier 400 includes a heat exchanger/dehumidifier 310A including a coil of tubing. FIGS. 5A-D are perspective views of coils 500A-D of tubing for a heat exchanger/dehumidifier 310, 310A, for implementing embodiments of the present disclosure. The coils 500A-D can be any suitable shape such as an oval 500A, a triangular coil 500B, a tapered coil 500C and a varying diameter coil 500D. The coil 500A-D can be formed in any suitable material capable of efficiently passing the heat between the cool water flowing through the heat exchanger/dehumidifier 310A. Exemplary materials for the coil of the heat exchanger/dehumidifier 310A can include copper, aluminum or other suitable materials. The humidifier walls and inner and outer surfaces can be formed from a metal (e.g., aluminum, copper, steel, stainless steel and alloys and combinations thereof and any other suitable metal) and plastic materials (e.g., polyethylene, PTFE, polyester resins, and any other suitable materials and combinations thereof.)

In one implementation, the coils 500A-D can be about 750 mm in height and between about 100 mm and about 600 mm in diameter. By way of example, the coils 500A-D are about 100 mm in diameter at a first end and about 600 mm at a second end, opposite from the first end. The coils 500A-D can be formed from a tubing having a diameter of between about 10 mm and about 25 mm.

Figure 6:
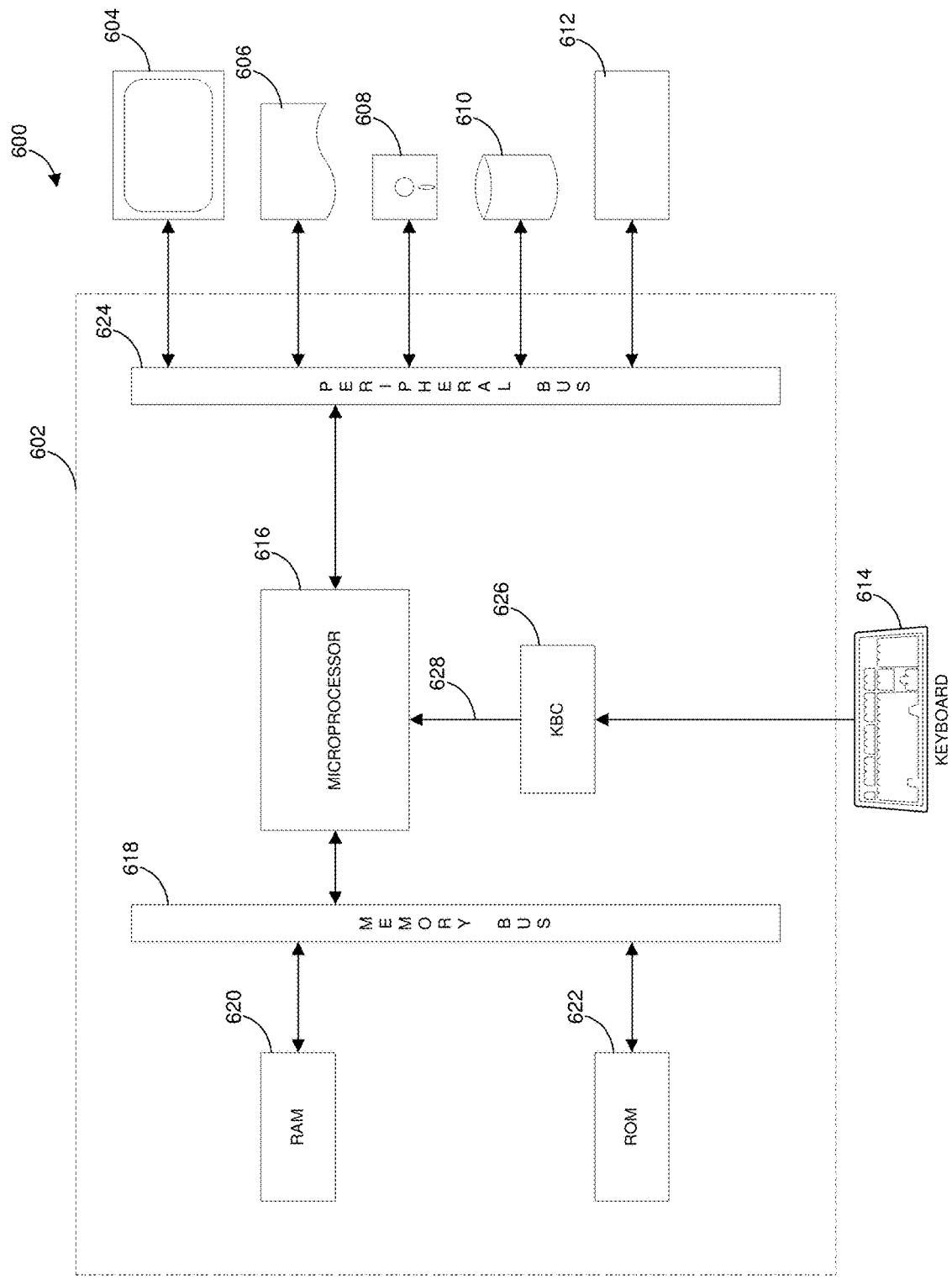
FIG. 6 is a block diagram of an example computer system for carrying out the processing for implementing embodiments of the present disclosure.

FIG. 6 is a block diagram of an example computer system 600 for implementing embodiments of the present disclosure. A general or specialized computer system, such as the computer system 600, can be used as the controller 180 for controlling a system executing the operations for performing at least a portion of the analyses described above. The computer system 600 includes a computer 602, a display 618, an optional printer or output device (not shown), a removable media (e.g., magnetic/optical/flash) drive 634, a mass storage system 614 (e.g., hard disk drive, solid state drive, or other suitable data storage device), a network interface 630, and a keyboard 622. Additional user interface devices such as a mouse 624, a touch pad or touch screen can also be included.

The computer 602 includes a central processing unit (CPU) 604, one or more data buses 610, random access memory (RAM) 628, read only memory (ROM) 612, and an input/output interface 1020. The computer 602 can be a personal computer (such as an IBM compatible personal computer, a Macintosh computer or Macintosh compatible computer), a workstation computer (such as a Sun Microsystems or Hewlett-Packard workstation), a server or some other suitable type of computer.

The CPU 604 can be a general purpose digital processor or a specially designed processor. The CPU 604 controls the operation of the computer system 600. Using instructions retrieved from memory (e.g. program(s) 608), the CPU 604 controls the reception and manipulation of input data and the output and display of data on output devices.

The data buses 610 are used by the CPU 604 to access the RAM 628, the ROM 612 and the mass storage 614. The RAM 628 is used by the CPU 604 as a general storage area and as scratch-pad memory, and can also be used to store input data and processed data. The RAM 628 and the ROM 612 can be used to store computer readable instructions or program code 608 readable and executable by the CPU 604 as well as other data.

The bus 610 can also be used to access the input, output, and storage devices used by the computer 602. These devices include the display 618, the optional printer (not shown), the removable media drive 634, and the network interface 630. The input/output interface 1020 is used to receive input from keyboard 622 and send decoded symbols for each pressed key to CPU 604 over the data bus 610.

The display 618 is an output device that displays images of data provided by the CPU 604 via the bus 610 or provided by other components in the computer system 600. The optional printer device, when operating as a printer, provides an image on a sheet of paper or a similar surface. Other output devices such as a plotter, projector, etc. can be used in place of, or in addition to, the printer device.

The removable media drive 634 and the mass storage 614 can be used to store various types of data. The removable media drive 634 facilitates transporting such data to other computer systems, and mass storage 614 permits fast access to large amounts of stored data. The mass storage 614 may be included within the computer system or may be external to the computer system such as network attached storage or cloud storage accessible over one or more networks (e.g., local area networks, wide area networks, wireless networks, Internet 1032) or combinations of such storage devices and locations. The mass storage 614 can include any one or more combinations of any suitable types of storage media including magnetic media, optical media, solid state, non-volatile memory devices, flash memory and any other suitable type of read and writeable media readable and writeable by the CPU 604.

The CPU 604 together with an operating system operate to execute computer readable code and logic and produce and use data. The computer code, logic and data may reside within the RAM 628, the ROM 612, or other integrated circuits such as within a portion of the processor, an application specific integrated circuit or other programmable logic array that can be utilized to express the computer code, logic and data, and/or the mass storage 614 or other media storage devices and combinations thereof. The computer code and data could also reside on a removable program medium and loaded or installed onto the computer system 600 when needed. Removable program media include, for example, DVD, CD-ROM, PC-CARD, floppy disk, flash memory, optical media and magnetic disk or tape.

The network interface 630 is used to send and receive data over a network 1032 connected to other computer systems. The network interface 630 can include an interface card or similar device and appropriate software implemented by the CPU 604 can be used to connect the computer system 600 to an existing network and receive and transmit data according to standard and specialized protocols such as local area networks, wide area networks, wireless networks, internet and any other suitable networks and network protocols to and from other computers. The network interface 630 can also be used to link multiple computers such as in a data center or a server network.

The network interface 630 can include or be in data communication with an application capable of providing remote access and/or control of the system so that the system can be controlled, monitored, store system operational data on a local or remote server or an application on another computing device in data communication with the controller. The remotely accessible and/or stored operational data can include current, at or near real time data, and/or historical data. The current, at or near real time data can include notifications of designated operational performance points. By way of example, a flow rate, temperature, pressure, humidity or other operational data can be available on a remote computing device such as a smart phone, tablet or other computing device in data communication with the controller via the Internet, or similar data network, so as to provide the operational data to a user that may be remote from the system. The user could act on the received operational data to control the system including increasing or decreasing various operational functions.

The keyboard 622 is used by a user to input commands and other instructions to the computer system 600. Other types of user input devices can also be used in conjunction with the present invention. For example, pointing devices such as a computer mouse, a track ball, a stylus, touch pad, touch screen or a tablet can be used to manipulate a pointer on a screen of a general-purpose computer.

Figure 7:
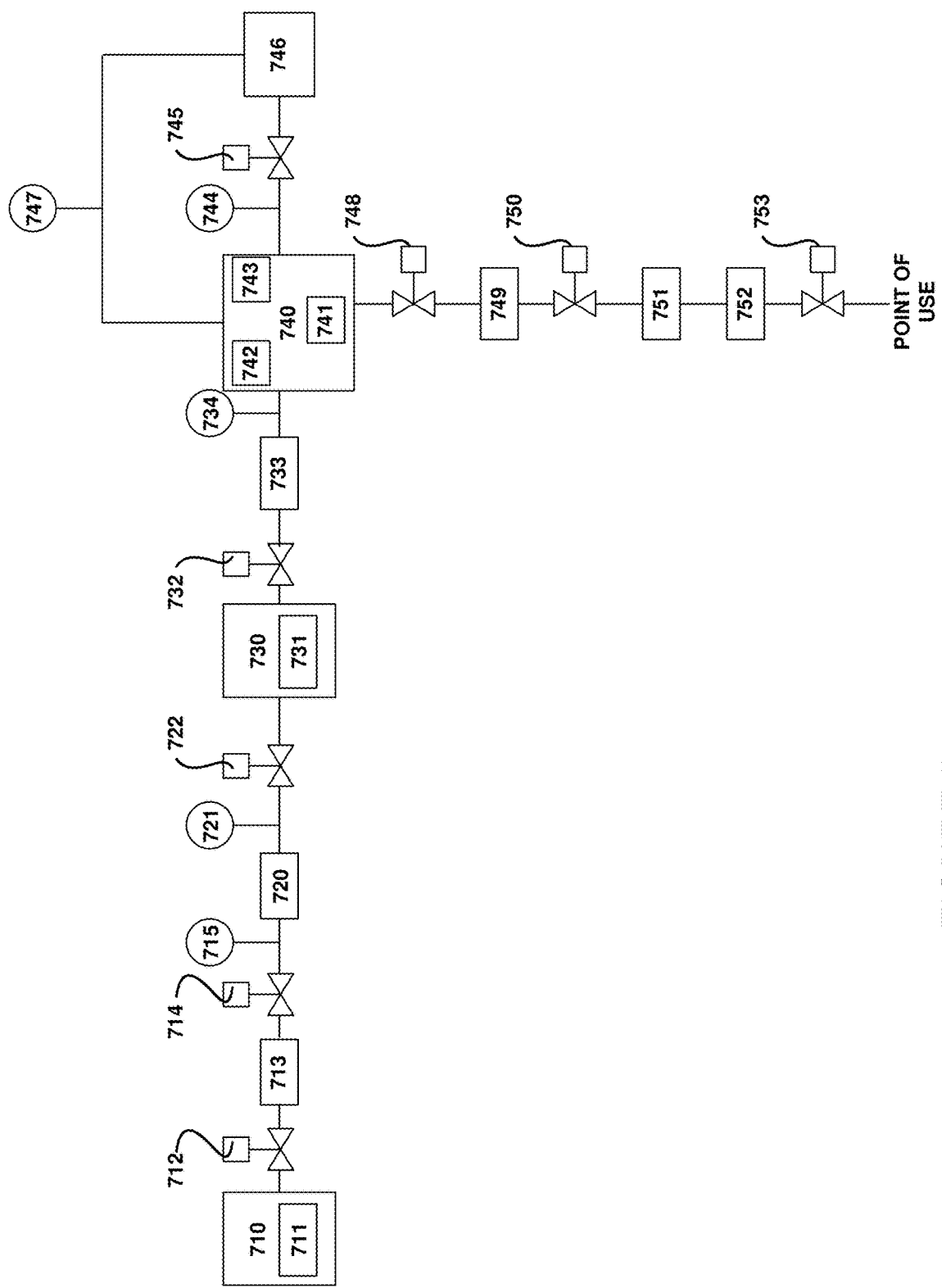
FIG. 7 is a simplified piping and instrumentation diagram of a rainwater collection and purification system, for implementing embodiments of the present disclosure.

FIG. 7 is a simplified piping and instrumentation diagram of a rainwater collection and purification system 700, for implementing embodiments of the present disclosure. The rainwater collection and purification system 700 includes a collection tank 710 for collecting rainwater. The collection tank 710 can include one or more sensors 711 such as a temperature sensor, water level sensor, water quality sensors (e.g., temperature, pH, salinity, optical clarity, electrical conductivity, etc.). The one or more sensors 711 are coupled to the controller 180 (shown in FIG. 1) to provide information regarding the contents of the collection tank 710 that are then used to manage the contents of the collection tank.

The collection tank 710 includes an outlet fluidly coupled to a pump 713. Valves 712, 714 can optionally be included to isolate the pump 713 and control flow from the collection tank 710. The pump 713 can pump the contents of the collection tank 710, as needed, through a preliminary filter 720. Optional sensors 715, 721 can include one or more of pressure sensors, flow sensors, flow controllers, temperature sensors. The optional sensors 715, 721 can be coupled to the controller 180 to provide data relating to the water flowing through and past the sensors and the operation of the preliminary filter 720 and the operation of the pump 713. Optional valve 722 can be used to isolate or purge the preliminary filter 720 and control flow through the preliminary filter to an inlet of a bulk storage 730.

The bulk storage 730 can include one or more sensors 731 such as a temperature sensor, water level sensor, water quality sensors (e.g., temperature, salinity, pH, optical clarity, electrical conductivity, etc.). The one or more sensors 731 are coupled to the controller 180 to provide information regarding the contents of the bulk storage 730 that are then used to manage the contents of the bulk storage.

The bulk storage 730 includes an outlet fluidly coupled to a pump 733. The pump 733 can pump the contents of the bulk storage, as needed, to the water purification subsystem 740. Optional sensor 734 can include one or more of pressure sensors, flow sensors, flow controllers, temperature sensors. The optional sensor 734 can be coupled to the controller 180 to provide data relating to the water flowing through and past the sensor and the operation of the pump 733.

The water purification subsystem 740 includes heat exchanger/dehumidifier 741 for preheating the water flowing through the cool water inlet and cooling the water vapor within an inner volume of the heat exchanger/dehumidifier. Optional sensor 734 can include one or more of pressure sensors, flow sensors, flow controllers, temperature sensors. An optional sensor 744 can be coupled to the controller 180 to provide data relating to the preheated water flowing through and past the sensor and the operation of the heat exchanger/dehumidifier 741. An optional valve 745 can also be fluidly coupled to an outlet of the heat exchanger/dehumidifier 741 to control flow out of the heat exchanger/dehumidifier.

The outlet of the heat exchanger/dehumidifier 741 is fluidly coupled to a heater 746 for heating the preheated water to a desired temperature, as can be monitored by optional sensor 747. Optional sensor 747 can include one or more of a temperature, pressure, flow sensor. The heated water is fluidly coupled from an outlet of the heater 746 to one or more nozzles 332 (shown in FIG. 3C) located in the inner volume of the heat exchanger/dehumidifier 741.

The nozzles 332 convert the heated water to a fine mist or water vapor. At least a portion of the mist and/or water vapor is condensed to liquid water by the cooling coil of the heat exchanger/dehumidifier 741. One or more sensors 742, 743 monitor and measure one or more of the temperatures and/or flow of the heated water through the nozzles, the temperature and/or humidity of the inner volume of the heat exchanger/dehumidifier 741.

The condensed, liquid water collects in the lower portion of the inner volume of the heat exchanger/dehumidifier 741 and passes through an outlet of the inner volume of the heat exchanger/dehumidifier.

An optional secondary filter 749 can also be included and fluidly coupled to the outlet of the inner volume of the heat exchanger/dehumidifier 741. An optional valve 748 can fluidly couple and control the flow of the water from the outlet of the inner volume of the heat exchanger/dehumidifier 741 to the secondary filter 749. The secondary filter 749 can include various types of filtering and flavoring of the water. The secondary filter 749 can include filters types such as very fine particle filters (e.g., about 1 to about 50 micron filter), an activated charcoal filter, a chemical filter, and any other suitable filter type. The secondary filter 749 can include a mineral source for injecting a desired quantity and type of minerals as may be desired to improve a taste of the potable water output from the secondary filter.

The outlet of the secondary filter 749 is coupled to an inlet of a potable water storage 751, through an optional valve 750. The potable water storage 751 can store potable water until needed. A pump 752 is fluidly coupled to an outlet of the potable water storage 751. The pump 752 delivers the potable water from the potable water storage 751 to a point of use through an optional valve 753.

The sensors 715, 721, 734, 742, 743, 744, 747 are coupled to the controller to provide data inputs to the controller for controlling the operation of the system. One or more of the valves 712, 714, 722, 732, 745, 748, 750, 753 can be two-way valves or three-way valves to provide isolation function and purge functions as may be needed for operating the system. A three-way valve can be used to bypass or purge one or more portions of the system. By way of example, valves 714, 722 can be used to purge filter 720 in a forward or reverse flow direction. One or more of the valves 712, 714, 722, 732, 745, 748, 750, 753 can be manual or electrically or pneumatically operated and controlled by the controller 180. One or more of the valves 712, 714, 722, 732, 745, 748, 750, 753 can be or can include a check valve for controlling direction of flow through the valve in one direction.

In one implementation, the rainwater collection and purification system 700 operate using the following Relationship 1.0:

Relationship 1.0: 4000 Watt=(flowrate)*4180*
(T_hot−20) where: hot water temperature T_hot
(measured at sensor 747)

By way of example: T_hot=90 degrees C.=1>water flowrate=4000/(4180*(90−20))=0.0136 kg/second=13.6 g/second=13.6 ml/second. Thus, the range of water flow rate to temperature can be calculated by Relationship 1.0 above.

The rainwater collection and purification system 700 can operate within a range of temperatures, flowrates and humidity's when the input water temperature and sensor 734 is sufficiently less than the temperature of the heated water vapor within the inner volume of the heat exchanger/dehumidifier 741, as can be measured by one or more of sensors 742, 743. This temperature differential between the input water temperature and the heated water vapor temperature causes a portion of the water vapor to condense on the exterior surfaces of the coil. The temperature differential can be relatively small as the humidity within the inner volume of the heat exchanger approaches 100 percent. The higher the humidity, the smaller the temperature differential. This is similar to calculating a dew point. Conversely, as the humidity within the inner volume of the heat exchanger is reduced, the temperature differential will increase to force condensation of the treated water on the exterior of the heat exchanger coil. Absolute temperatures are not critical. The input water temperature at sensor 734 will be above 0 degrees C. so that the input water can flow into the system freely. The heated water vapor is at least 1 degree C. higher than the surface of the coil and the inner air temperature in the inner volume of the heat exchanger is at least 2 degrees C. above the input water temperature at nearly 100 percent humidity to cause water to condense on the coil. If the input water temperature is at 1 degree C., and the humidity is only 70 percent, then the temperature of the air inside the inner volume is at least 6 degrees C. The greater the temperature differential, the more rapid the water condensation will occur and a corresponding increase in production volume of purified water. Table 1 provides a range of exemplary dew point operating temperatures and relative humidity:

TABLE 1

Dew Point Temperature (degrees F.) vs Relative Humidity

| | Air Temperature in inner volume of heat exchanger | | | | | | | | | | | | | | |
|---|---|---|---|---|---|---|---|---|---|---|---|---|---|---|---|
| | 32 | 35 | 40 | 45 | 50 | 55 | 60 | 65 | 70 | 75 | 80 | 85 | 90 | 95 | 100 |
| Humidity Percent 100 | 32 | 35 | 40 | 45 | 50 | 55 | 60 | 65 | 70 | 75 | 80 | 85 | 90 | 95 | 100 |
| 90 | 30 | 33 | 37 | 42 | 47 | 52 | 57 | 62 | 67 | 72 | 77 | 82 | 87 | 92 | 97 |
| 80 | 27 | 30 | 34 | 39 | 44 | 49 | 54 | 58 | 64 | 68 | 73 | 78 | 83 | 88 | 93 |
| 70 | 24 | 27 | 31 | 36 | 40 | 45 | 50 | 55 | 60 | 64 | 69 | 74 | 79 | 84 | 88 |
| 60 | 20 | 24 | 28 | 32 | 36 | 41 | 46 | 51 | 55 | 60 | 65 | 69 | 74 | 79 | 83 |
| 50 | 16 | 20 | 24 | 28 | 33 | 36 | 41 | 46 | 50 | 55 | 60 | 64 | 69 | 73 | 78 |
| 40 | 12 | 15 | 18 | 23 | 27 | 31 | 35 | 40 | 45 | 49 | 53 | 58 | 62 | 67 | 71 |
| 30 | 8 | 10 | 14 | 16 | 21 | 25 | 29 | 33 | 37 | 42 | 46 | 50 | 54 | 59 | 62 |
| 20 | 6 | 7 | 8 | 9 | 13 | 16 | 20 | 24 | 28 | 31 | 35 | 40 | 43 | 48 | 52 |
| 10 | 4 | 4 | 5 | 5 | 6 | 8 | 9 | 10 | 13 | 17 | 20 | 24 | 27 | 30 | 34 |

It will be further appreciated that the instructions represented by the operations in the above figures are not required to be performed in the order illustrated, and that all the processing represented by the operations may not be necessary to practice the invention. It should also be appreciated that some operations may have sub-operations and in other instances, certain operations described herein may not be included in the illustrated operations. Further, the processes described in any of the above figures can also be implemented in software stored in any one of or combinations of the RAM, the ROM, or the hard disk drive.

Any of the operations described herein that form part of the disclosure are useful machine operations. The disclosure also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method of purifying water comprising:
   collecting water; and
   sanitizing the collected water wherein sanitizing the collected water includes:
     preheating the collected water in a heat exchanger to output preheated water;
     heating the preheated water in a heater to produce a heated water having a temperature of between about 80 degrees C. and about 100 degrees C., wherein at least a portion of a heat energy input to the heated water is solar energy;
     creating water vapor in a single chamber humidifier dehumidifier, the single chamber humidifier dehumidifier including the heat exchanger, wherein creating the water vapor in the single chamber humidifier dehumidifier includes spraying the heated water through one or more nozzles fluidly coupled to an outlet of the heater into a circulating airflow inside the single chamber humidifier dehumidifier;
     circulating the water vapor within the single chamber humidifier dehumidifier using a variable speed fan having a circulating rate, and wherein the circulating rate is modulated based on a difference between the water vapor temperature and a temperature of an outer surface of the heat exchanger and a humidity of the water vapor in the inner volume, wherein the one or more nozzles are not electrically connected to an electrical power source;
     cooling a first portion of the water vapor to cause the first portion of the water vapor to condense on an outer surface of the heat exchanger to form a first portion of potable water;
     collecting the first portion of potable water, wherein the first portion of the potable water drips off the outer surface of the heat exchanger to at least one of a plurality of angled lower inner surfaces to collect at a bottom of an inner volume of the single chamber humidifier dehumidifier; and
     delivering the first portion of potable water.

2. The method of claim 1, wherein collecting the water includes filtering the collected water to remove particulate matter in a first stage filter.

3. The method of claim 2, wherein delivering the first portion of the potable water includes filtering the potable water through a second stage filter.

4. The method of claim 1, further comprising adding a mineral to the first portion of potable water.

5. The method of claim 1, wherein the collected water has an ambient temperature and preheating the collected water in the heat exchanger to output preheated water having a temperature about 20 degrees C. greater than the ambient temperature.

6. The method of claim 1, wherein a fan circulates the airflow along the outer surface of the heat exchanger.

7. The method of claim 1, further comprising:
   condensing a second portion of the water vapor on one or more inner surfaces of the single chamber humidifier dehumidifier to form a second portion of potable water;
   collecting the second portion of potable water, wherein the second portion of the potable water drips off the one or more inner surfaces of the single chamber humidifier dehumidifier to at least one of the plurality of angled lower inner surfaces to collect at the bottom of the inner volume of the single chamber humidifier dehumidifier; and
   delivering the second portion of potable water.

8. The method of claim 7, further comprising increasing a temperature of the collected water wherein increasing the temperature of the collected water includes:
   condensing a third portion of the water vapor on at least one inner surface of the single chamber humidifier dehumidifier to form a third portion of water;
   collecting the third portion of water in a bottom portion of the single chamber humidifier dehumidifier; and
   returning the third portion of water to the collected water.

9. A method of purifying water comprising:
   preheating collected water in a heat exchanger to output preheated water having a preheated water temperature;
   heating the preheated water in a solar water heater to a heated water temperature between 80 degrees C. and 100 degrees C.;
   injecting the heated water through a nozzle fluidly coupled to an outlet of the heater into a single chamber humidifier dehumidifier creating water vapor in the single chamber humidifier dehumidifier having a water vapor temperature, wherein the nozzle injects the heated water into a circulating airflow inside the single chamber humidifier dehumidifier, the single chamber humidifier dehumidifier including the heat exchanger;
   circulating the water vapor though the single chamber humidifier dehumidifier with a variable speed fan having a circulating rate, and wherein the circulating rate is modulated based on a difference between the water vapor temperature and a temperature of an outer surface of the heat exchanger and a humidity of the water vapor in the inner volume;
   cooling a first portion of the water vapor to cause the first portion of the water vapor to condense on an outer surface of the heat exchanger to form a first portion of potable water;
   collecting the first portion of potable water, wherein the first portion of the potable water drips off the outer surface of the heat exchanger to at least one of a plurality of angled lower inner surfaces to collect at a bottom of an inner volume of the single chamber humidifier dehumidifier; and
   delivering the first portion of potable water.

10. The method of claim 9, further comprising:
    condensing a second portion of the water vapor on one or more inner surfaces of the single chamber humidifier dehumidifier to form the second portion of potable water;

collecting the second portion of potable water;
delivering the second portion of potable water; and
increasing a temperature of the collected water, wherein increasing the temperature of the collected water includes:
  condensing a third portion of the water vapor on at least one inner surface of the single chamber humidifier dehumidifier to form a third portion of water;
  collecting the third portion of water in a bottom portion of the single chamber humidifier dehumidifier; and
  returning the third portion of water to the collected water.

* * * * *